United States Patent
Fuhry et al.

(10) Patent No.: US 11,048,816 B2
(45) Date of Patent: Jun. 29, 2021

(54) SECURE DATABASE UTILIZING DICTIONARY ENCODING

(71) Applicant: SAP SE, Walldorf (DE)

(72) Inventors: Benny Fuhry, Karlsruhe (DE); Jayanth Jain Hassan Ajith Kumar, Berlin (DE); Florian Kerschbaum, Karlsruhe (DE)

(73) Assignee: SAP SE, Walldorf (DE)

( * ) Notice: Subject to any disclaimer, the term of this patent is extended or adjusted under 35 U.S.C. 154(b) by 178 days.

(21) Appl. No.: 16/373,066

(22) Filed: Apr. 2, 2019

(65) Prior Publication Data

US 2020/0320213 A1    Oct. 8, 2020

(51) Int. Cl.
| | |
|---|---|
| *G06F 12/14* | (2006.01) |
| *G06F 11/30* | (2006.01) |
| *G06F 21/62* | (2013.01) |
| *G06F 16/2455* | (2019.01) |
| *G06F 16/248* | (2019.01) |

(52) U.S. Cl.
CPC ........ *G06F 21/6227* (2013.01); *G06F 16/248* (2019.01); *G06F 16/2455* (2019.01); *G06F 2221/2149* (2013.01)

(58) Field of Classification Search
CPC . G06F 21/6227; G06F 16/2455; G06F 16/248
USPC ........................................................ 713/189
See application file for complete search history.

(56) References Cited

U.S. PATENT DOCUMENTS

| | | | |
|---|---|---|---|
| 10,740,474 B1* | 8/2020 | Ghetti | H04L 9/0822 |
| 2011/0225659 A1* | 9/2011 | Isaacson | G06F 21/604 |
| | | | 726/28 |
| 2011/0235799 A1* | 9/2011 | Sovio | H04L 9/3073 |
| | | | 380/30 |
| 2014/0157370 A1* | 6/2014 | Plattner | G06F 21/6245 |
| | | | 726/4 |
| 2015/0149427 A1* | 5/2015 | Kerschbaum | G06F 16/951 |
| | | | 707/706 |

(Continued)

OTHER PUBLICATIONS

Changda Wang; Dictionary Based Secure Provenance Compression for Wireless Sensor Networks; IEEE Xplore:2016; pp. 405-418.*

(Continued)

*Primary Examiner* — Monjur Rahim
(74) *Attorney, Agent, or Firm* — Fountainhead Law Group P.C.

(57) ABSTRACT

Embodiments offer database security utilizing dictionary encoding, with certain functionality being implemented inside a secure environment, e.g., a Trusted Execution Environment (TEE). In particular, the secure environment receives a secret key from a data owner, and receives an encrypted query range and a dictionary reference from a query engine. Based upon the query range decrypted using the secret key, and also the dictionary loaded from a database, the secure environment searches the dictionary to produce list of value identifiers corresponding to the query range. The value identifiers are communicated outside the secure environment to the query engine for further processing (e.g., to generate RecordIDs), ultimately producing a query result for a user. Particular embodiments may leverage the processing power of an in-memory database engine in order to perform the role of the query engine that interacts with the secure environment.

20 Claims, 12 Drawing Sheets

(56) References Cited

U.S. PATENT DOCUMENTS

| | | | | |
|---|---|---|---|---|
| 2015/0356314 | A1* | 12/2015 | Kumar | G06F 16/2228 713/165 |
| 2015/0379299 | A1* | 12/2015 | Klein | G06F 21/6227 713/193 |
| 2016/0125198 | A1* | 5/2016 | Hahn | G06F 21/6227 713/165 |
| 2016/0132692 | A1* | 5/2016 | Kerschbaum | G06F 21/6227 713/189 |
| 2016/0285623 | A1 | 9/2016 | Yoon et al. | |
| 2017/0099262 | A1* | 4/2017 | Kerschbaum | G06F 16/23 |
| 2017/0235969 | A1* | 8/2017 | Kamara | H04L 63/0807 713/159 |
| 2018/0095982 | A1* | 4/2018 | Hakamata | G06F 16/148 |
| 2018/0276399 | A1 | 9/2018 | Fuhry et al. | |
| 2019/0155684 | A1* | 5/2019 | Akutsu | G06F 11/1048 |
| 2020/0097571 | A1* | 3/2020 | Mathur | G06F 16/221 |
| 2020/0266972 | A1* | 8/2020 | Chakraborty | H04L 9/0894 |

OTHER PUBLICATIONS

Agrawal et al. "Order Preserving Encryption for Numeric Data", SIGMOD dated Jun. 13-18, 2004, 12 pages.
Arasu et al. "Transaction Processing on Confidential Data Using Cipherbase", 2015, 15 pages.
Arnautov et al. "SCONE: Secure Linux Containers with Intel SGX", 12th Usenix Symposium on Operating Systems Design and Implementation, dated Nov. 2-4, 2016, 17 pages.
Bajaj et al. "TrustedDB: A Trusted Hardware Based Database With Privacy and Data Confidentiality", IEEE vol. 26, dated Mar. 2014, 14 pages.
Baumann et al. "Shielding Applications From an Untrusted Cloud With Haven", 11th Usenix Symposium on Operating Systems Design and Implementation, dated Oct. 6-8, 2014, 19 pages.
Boldyreva et al. "Order-Preserving Symmetric Encryption", 28th Annual International Cryptology Conference, dated Nov. 4, 2012, 28 pages.
Boldyreva et al. "Order-Preserving Encryption Revisited: Improved Security Analysis and Alternative Solutions", 2011, 18 pages.
Boneh, et al. "Conjunctive, Subset, and Range Queries on Encrypted Data", 29 pages.
Cash et al. "Highly-Scalable Searchable Symmetric Encryption With Support for Boolean Queries" 21 pages.
Demertzis et al. "Practical Private Range Search Revisited", SIGMOD dated Jun. 26-Jul. 1, 2016, 14 pages.
Durak et al. "What Else is Revealed by Order-Revealing Encryption?", 2016, 12 pages.
Egorov et al. "ZeroDB White Paper", dated Mar. 9, 2016, 11 pages.
Faber et al. "Rich Queries on Encrypted Data: Beyond Exact Matches" 2015, 31 pages.
Goh, Eu-Jin "Secure Indexes", dated Mar. 16, 2004, 18 pages.
Gribov et al. "StealthDB: A Scalable Encrypted Database with Full SQL Query Support", dated Nov. 7, 2017, 18 pages.
Grubbs et al. "Leakage-Abuse Attacks Against Order-Revealing Encryption", IEEE, Symposium on Security and Privacy 2017, 18 pages.
Lemke et al. "Speeding up Queries in Column Stores A Case for Compression", 2010, 13 pages.
Lu et al. "Privacy-Preserving Logarithmic—Time Search o Encrypted Data in Cloud" 2012, 17 pages.
Naveed et al. "Inference Attacks on Property-Preserving Encrypted Databases", CCS dated Oct. 12-16, 2015, 13 pages.
Pappas et al. "Blind Seer: A Scalable Private DBMS", IEEE Symposium on Security and Privacy 2014, 16 pages.
Popa et al. "CryptDB: Protecting Confidentiality With Encrypted Query Processing", SOSP Oct. 23-26, 2011, 17 pages.
Priebe et al. "EnclaveDB: A Secure Database Using SGX" 2018, 15 pages.
Shen et al. "Predicate Privacy in Encryption Systems" Dec. 24, 2008, 33 pages.
Shi et al. "Multi-Dimensional Range Query Over Encrypted Data" 2007, 49 pages.
Song et al. "Practical Techniques for Searches on Encrypted Data", IEEE 2000, 12 pages.
Tu et al. "Processing Analytical Queries Over Encrypted Data" dated Aug. 26-30, 2013, 4 pages.
Bech, Joakim "TEE Development with No Hardware—Is That Possible?", Dated Nov. 28, 2016, 8 pages.
Bhat, Akshay "Trusted Software Development Using OP-TEE", dated Oct. 16, 2017, 8 pages.
Fuhry et al. "Hardix: Practical and Secure Index with SGX", 12th European Conference on Computer vision, ECCV 2012, 20 pages.
Extended European Search Report for EP Application No. 19 21 2829, dated Aug. 6, 2020, 9 pages.

* cited by examiner

|   | order leak. | high | medium | low |
|---|---|---|---|---|
| frequency leak. | | | | |
| high | | ED1.1 | ED2.1 | ED3.1 |
| medium | | ED1.2 | ED2.2 | ED3.2 |
| low | | ED1.3 | ED2.3 | ED3.3 |

FIG. 5

Column

| RecordID | FName |
|---|---|
| 0 | Jessica |
| 1 | Ella |
| 2 | Archie |
| 3 | Jessica |
| 4 | Hans |
| 5 | Jessica |
| 6 | Archie |

Dictionary

| ValueID | Value |
|---|---|
| 0 | Archie |
| 1 | Ella |
| 2 | Jessica |
| 3 | Hans |

Attribute Vector

| RecordID | ValueID |
|---|---|
| 0 | 2 |
| 1 | 1 |
| 2 | 0 |
| 3 | 2 |
| 4 | 3 |
| 5 | 2 |
| 6 | 0 |

FIG. 6

Procedure 1 HSDS_DictSearch_1.1($\tau$, $eD$)

1: $SK_D = \text{DeriveKey}(SK_{DB}, colName, tabName)$
2: $R = (R_s, R_e) = (\text{PAE.Dec}(SK_D, \tau_s), \text{PAE.Dec}(SK_D, \tau_e))$
3: $vid_{min} = \text{BinarySearchLM}(eD, R_s)$
4: $vid_{max} = \text{BinarySearchRM}(eD, R_e)$
5: return $vid = (vid_{min}, vid_{max})$

FIG. 9

Procedure 2 HSDS_DictSearch_2.1($\tau, eD, encWrapIndex$)

1: $SK_D = \text{DeriveKey}(SK_{DB}, colName, tabName)$
2: $R = (R_e, R_e) = (\text{PAE\_Dec}(SK_D, \tau_e), \text{PAE\_Dec}(SK_D, \tau_e))$
3: $WrapIndex = \text{PAE\_Dec}(SK_D, encWrapIndex)$
4: $vid_{min} = \text{BinSearchSpecialS}(eD, R_s, WrapIndex)$
5: $vid_{max} = \text{BinSearchSpecialE}(eD, R_e, WrapIndex)$
6: $vid = \emptyset$
7: if ($vid_{min} <$ WrapIndex & $vid_{max} <$ WrapIndex) |
   ($vid_{min} \geq$ WrapIndex & $vid_{max} \geq$ WrapIndex) then
8: 
9:   $vid = (vid_{min}, vid_{max})$
10: else if $vid_{min} \geq$ WrapIndex & $vid_{max} <$ WrapIndex then
11:   if $vid_{max} == eD.\#v$ then
12:     $vid = (0, vid_{max})$
13:   else
14:     $vid = (0, vid_{max}) \wedge (vid_{min}, eD.\#v - 1)$
15:   end if
16: end if
17: return vid

FIG. 10

Procedure 3 BinSearchSpecialS/BinSearchSpecialE($eD$, $sVal, WrapIndex$)

1: $l = 0, u = eD.\#v$
2: $N = $ ENCODE(highest supported value)
3: $r = $ ENCODE(PAE_Dec($SK_D, eD.v_0$))
4: $sVal = $ ENCODE($sVal$)
5: if WrapIndex $\neq 0$ then
6:     $sVal = (sVal - r)\%N$
7: end if
8: while $l < u$ do
9:     $j = \lceil (l + u)/2 \rceil$
10:     $m = $ ENCODE(PAE_Dec($SK_D, eD.v_j$))
11:     if WrapIndex $== 0$ then
12:         $cVal = m$
13:     else
14:         $cVal = (m - r)\%N$
15:     end if
16:     if ($cVal < sVal$) ($cVal <= sVal$) then
17:         $l = j + 1$
18:     else
19:         $u = j$
20:     end if
21: end while
22: return ($l$) ($l - 1$)

FIG. 11

| Column | | | Dictionary | | | Attribute Vector | |
|---|---|---|---|---|---|---|---|
| RecordID | FName | | ValueID | Value | | RecordID | ValueID |
| 0 | Jessica | | 0 | Hans | | 0 | 1 |
| 1 | Ella | | 1 | Jessica | | 1 | 2 |
| 2 | Archie | | 2 | Ella | | 2 | 3 |
| 3 | Jessica | | 3 | Archie | | 3 | 1 |
| 4 | Hans | | | | | 4 | 0 |
| 5 | Jessica | | | | | 5 | 1 |
| 6 | Archie | | | | | 6 | 3 |

Procedure 4 HSDS_DictSearch_3.1($\tau, eD$)

1: $SK_D = \text{DeriveKey}(SK_{DB}, colName, tabName)$
2: $R = (R_s, R_e) = (\text{PAE\_Dec}(SK_D, \tau_s), \text{PAE\_Dec}(SK_D, \tau_e))$
3: $vid = \emptyset$
4: for $i = 0; i < D.\#v; i++$ do
5: $\quad v = \text{PAE\_Dec}(SK_D, eD.v_i)$
6: $\quad$ if $R_s <= v <= R_e$ then
7: $\quad\quad vid.\text{APPEND}(i)$
8: $\quad$ end if
9: end for
10: return $vid$

FIG. 12

Procedure 5 getRndBucketSizes($oc(C.v), bs_{max}$)

1: $prevTotal = total = \#bs = 0$
2: $bs_{sizes} = \emptyset$
3: while $total < oc(C.v)$ do
4: $\quad \#bs \mathrel{+}= 1$
5: $\quad rnd \xleftarrow{\$} [1, bs_{max}]$
6: $\quad bs_{sizes}.\text{APPEND}(rnd)$
7: $\quad prevTotal = total$
8: $\quad total \mathrel{+}= rnd$
9: end while
10: $bs_{sizes}.\text{LAST} = oc(C.v) - prevTotal$
11: return $bs_{sizes}, \#bs$

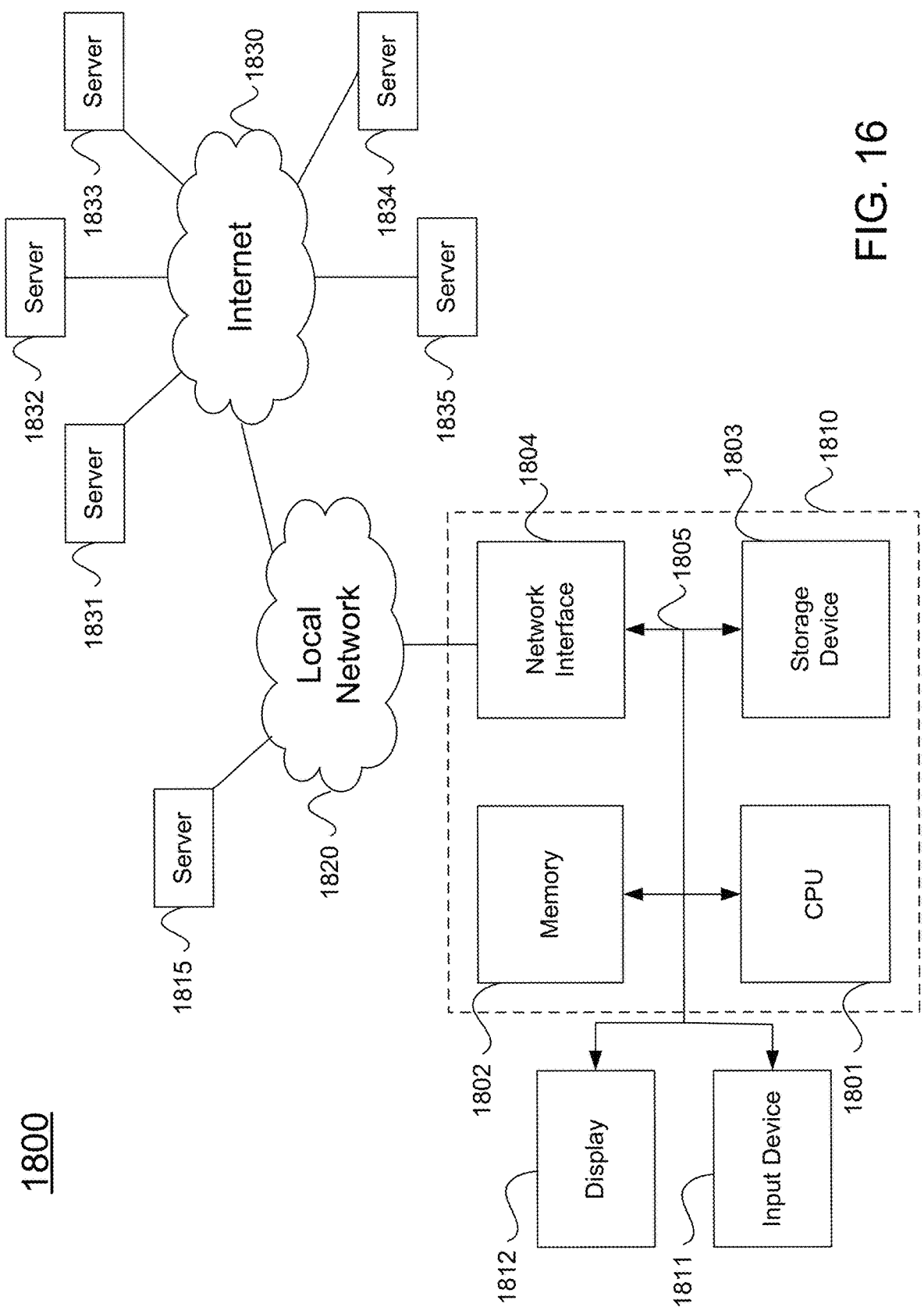

SECURE DATABASE UTILIZING DICTIONARY ENCODING

BACKGROUND

Unless otherwise indicated herein, the approaches described in this section are not prior art to the claims in this application and are not admitted to be prior art by inclusion in this section.

Data Warehouses may be used by companies for business intelligence and decision support. Those warehouses can include huge datasets, and the underlying databases are optimized for complex, read-oriented, analytic queries.

Outsourcing the data and query processing to the cloud, and more specifically to a Database-as-a-Service (DBaaS) provider, can reduce costs, reduce maintenance efforts and bring higher availability. However companies may be reluctant to outsource sensitive data to an untrusted DBaaS provider, due at least to security concerns.

SUMMARY

Embodiments offer database security utilizing dictionary encoding, with certain functionality being implemented inside a secure environment, e.g., a Trusted Execution Environment (TEE). In particular, the secure environment receives a secret key from a data owner. Then, the secure environment receives an encrypted query range and a dictionary reference from a query engine. The dictionary may be loaded from outside the secure environment, or alternatively may already be present inside the secure environment. Based upon the query range decrypted using the secret key, the secure environment searches the values matching the query and compiles a list of corresponding value identifiers. The value identifiers are communicated outside the secure environment to the query engine for further processing (e.g., to generate RecordIDs), ultimately producing a query result for a user. Particular embodiments may leverage the processing power of an in-memory database engine in order to perform the role of the query engine that interacts with the secure environment.

The availability of different types of encrypted dictionaries for use, offers flexibility in providing secure storage. In particular, as described later in connection with an exemplary embodiment, various encrypted dictionaries may offer different tradeoffs regarding characteristics that can include but are not limited to: strength of security afforded; performance (e.g., speed); and/or storage (e.g., memory) consumption.

The following detailed description and accompanying drawings provide a better understanding of the nature and advantages of various embodiments.

BRIEF DESCRIPTION OF THE DRAWINGS

FIG. 5 is a table presenting nine Encrypted Dictionaries according to the example.

FIG. 6 illustrates dictionary encoding for one of the datatypes of the example.

FIG. 9 illustrates a procedure for processing inside of the enclave according to a datatype of the example.

FIG. 10 illustrates a procedure for a special binary search that can handle encrypted wrapped data.

FIG. 11 illustrates dictionary encoding for one of the datatypes of the example.

FIG. 12 illustrates a procedure for performing a linear scan.

FIG. 16 illustrates an example computer system.

DETAILED DESCRIPTION

Described herein are methods and apparatuses implementing simulation of a database conversion according to various embodiments. In the following description, for purposes of explanation, numerous examples and specific details are set forth in order to provide a thorough understanding of embodiments according to the present invention. It will be evident, however, to one skilled in the art that embodiments as defined by the claims may include some or all of the features in these examples alone or in combination with other features described below, and may further include modifications and equivalents of the features and concepts described herein.

Figure 1:
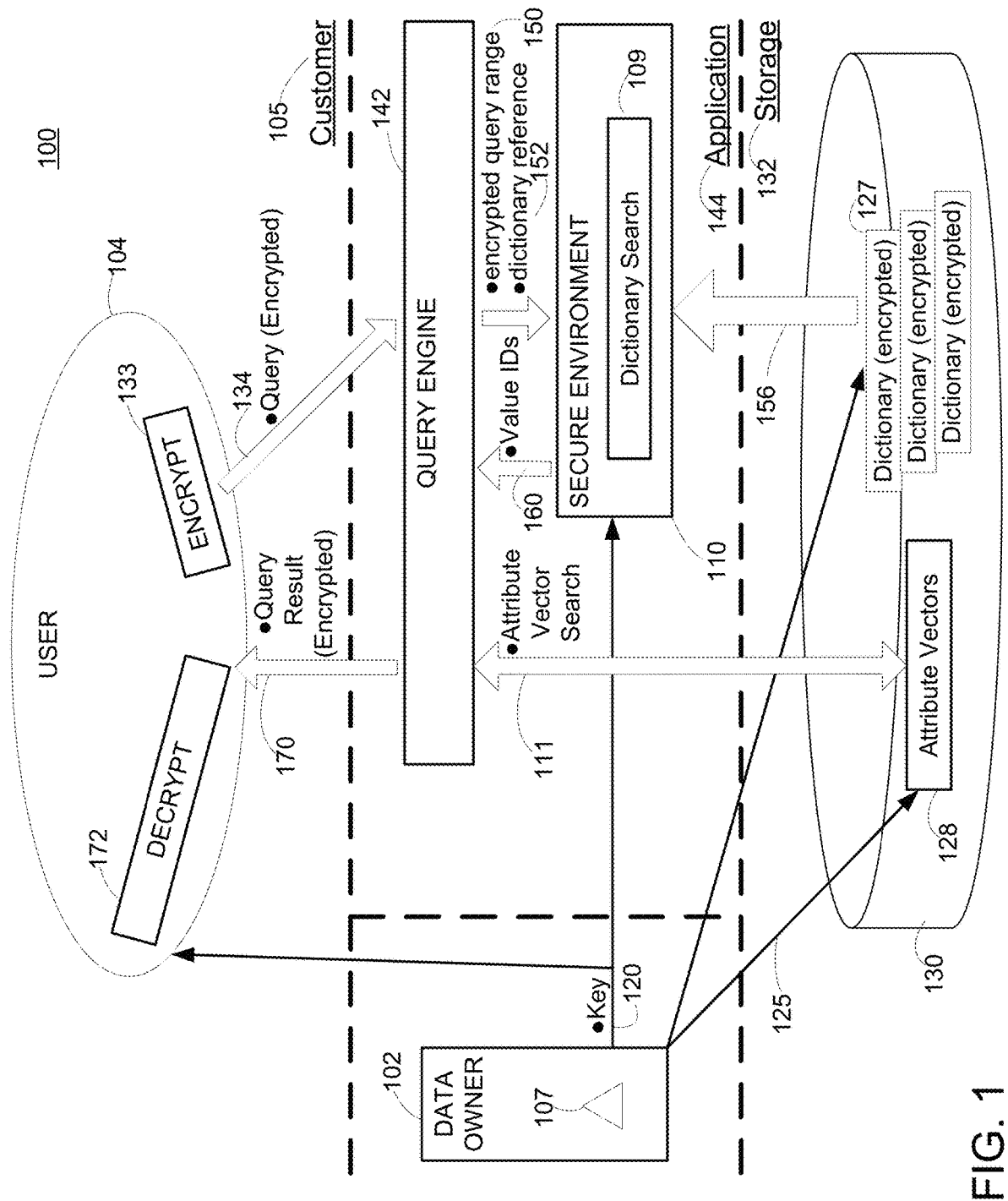
FIG. 1 shows a simplified diagram of a system according to an embodiment.

FIG. 1 shows a simplified view of an example system 100 that is configured to perform database dictionary encoding according to an embodiment. Specifically, a trusted Data Owner 102 seeks to outsource its data for storage and querying in a secure manner, by user 104 who is located in a customer environment 105.

While FIG. 1 shows the Data Owner and the user as being separate entities, this is not required. According to certain embodiments, the data owner and the user could be the same entity.

Initially, the Data Owner prepares its unencrypted data locally. As part of this data preparation, each column of the unencrypted data is separated into a Dictionary and Attribute Vector pursuant to a dictionary encryption security scheme. This is further discussed below in connection with FIG. 3.

Then, the Data Owner selects a per-column dictionary encoding 107. This per-column dictionary encoding can be a plaintext encoding Such plaintext columns are not further processed locally by the data owner.

However, the selected per-column dictionary encoding may be an Encrypted Datatype. As described below in connection with FIG. 5, various different Encrypted Dictionaries may offer certain tradeoffs regarding characteristics such as:
  strength of security afforded;
  performance (e.g., speed); and/or
  storage (e.g., memory) consumption.

Columns with Encrypted Dictionaries are processed locally at the Data Owner in two steps. First, the Dictionaries and Attribute Vectors are modified depending on the selected Encrypted Datatype. Second, all Dictionary entries are encrypted individually with randomized encryption under a secret key 120.

Next, the Data Owner provisions the secret key to both the user 104 and to the secure environment 110, whose role is discussed below. In certain embodiments an attestation feature of the secure environment may be used for authentication and to establish a secure connection to provision the secret key to the secure environment.

The Data Owner also deploys 125 the Dictionaries 127 and Attribute Vector data 128 for storage in the database 130 of the storage layer 132. That storage layer may be administered by a DBaaS provider.

From this point on, the setup of data in secure form within the database is now completed. The user is free to formulate and issue an encrypted query 134 to the database.

Such queries can be based upon equality selects, anti-equality selects, greater than selects (inclusive and exclusive), less than selects (inclusive and exclusive), and range selects (inclusive and exclusive). Other query functionalities such as counts, aggregations, and average calculations, may be available.

Prior to the issuance from the user, the queries may be converted to range selects, and the range start and range end encrypted with randomized encryption 133. The conversion to range selects offers the additional benefit that an untrusted server ultimately receiving the query, cannot differentiate query types. Also, an untrusted server cannot learn if the values were previously queried.

The resulting encrypted query 134 is issued to the query engine 142 of the application layer 144. As described later in connection with the example, the encrypted query may be initially processed by validating the query syntax and checking for the presence of the requested tables and columns. The high-level query language (e.g., SQL) of the encrypted query may be translated to a set of algebraic operations to be performed on each column. Possible query plans are evaluated, and a decision regarding an efficient query plan execution is reached.

While FIG. 1 has shown the query engine as being located in the application layer overlying the database, this is not required. Particular embodiments may leverage the processing power of an in-memory database engine, to perform one or more of the functions as described herein. In particular, FIG. 17 (described later below) illustrates an in-memory database implementation where a single in-memory database engine located in the database handles both querying and data storage (e.g., attribute vector, dictionary) functions.

Returning to FIG. 1, the query engine then only processes columns for which the incoming query includes a filter expression (i.e., a range query is performed on that column). For these columns, it obtains the corresponding metadata and processes the columns one after another according to the query plan.

Plaintext columns that are processed as part of the query, are handled regularly as defined by the underlying storage layer.

By contrast, columns of an Encrypted Dictionary are processed as part of the query, in the following two steps: (1) conducting a dictionary search 109 within a secure environment 110; and (2) conducting an Attribute Vector 111 search outside of the secure environment.

Briefly, the secure environment guarantees that code and data loaded within, are protected with respect to confidentiality and integrity. One type of secure environment is the Trusted Execution Environment (TEE) that is afforded by certain processor architectures.

A TEE as an isolated execution environment provides security features such as isolated execution, and integrity of applications executing with the TEE, together with confidentiality of their assets. Specific examples of such TEEs include but are not limited to:

the Platform Security Processor (PSP) available from Advanced Micro Devices (AMD) of Santa Clara, Calif.;

the AMD Secure Execution Environment, available from AMD;

the TrustZone available from ARM of San Jose, Calif.;

the Trusted Execution Technology available from Intel Corporation of Santa Clara, Calif.;

the SGX Software Guard Extensions available from Intel;

the "Silent Lake" available on Intel Atom processors;

the MultiZone™ Security Trusted Execution Environment available from the RISC-V foundation.

Processing of an Encrypted Dictionary begins with the Query Engine passing to the secure environment:

the encrypted range 150, and a reference 152 to the corresponding Dictionary, The secure environment decrypts the range using the key. Then, secure environment performs a search 109 in the dictionary.

This is done by loading 156 the dictionary 127 from the database and individually decrypting the appropriate values. While FIG. 1 shows the database as being located outside of the secure environment, this is not required. According to some embodiments, the database may be located in the secure environment. The database may be located on the same machine or on any other machine from the secure environment.

The dictionary searching 109 may call a TEE function. As described below in the example, how this dictionary search is performed inside the secure environment, depends on the concrete Encrypted Dictionary of the filtered column. However, the result is always the secure environment returning a list of ValueIDs. This represents the limited involvement of the secure environment in performing query processing according to embodiments.

As a result of the dictionary searching, the secure environment returns a list of ValueIDs 160 to the Query Engine. The Query Engine in turn references that list of ValueIDs in order to perform a search 111 in the Attribute Vector stored in the database.

The resulting RecordIDs of all filtered columns are collected by the Query Engine. Where an "and" or an "or" filter was performed upon multiple columns of a table, RecordIDs might be combined or deducted.

The resulting RecordIDs are used to obtain the encrypted values from the corresponding dictionaries. The RecordIDs of the filters are also used to retrieve the corresponding encrypted values for columns that were only selected.

The Query Engine adds all results to a result set, and passes the encrypted query result 170 back to the user. There, the query result is decrypted 172 according to the secret key for rendering into a form intelligible to the user.

Of the total query processing, it is emphasized that only a small subset (i.e., range decryption; dictionary searching) is actually performed inside the secure environment. This allows existing database functionalities of the storage layer (e.g., persistency management, multiversion concurrency control, or access management) to remain unaltered while still affording desired security to the data owner and user.

Figure 2:
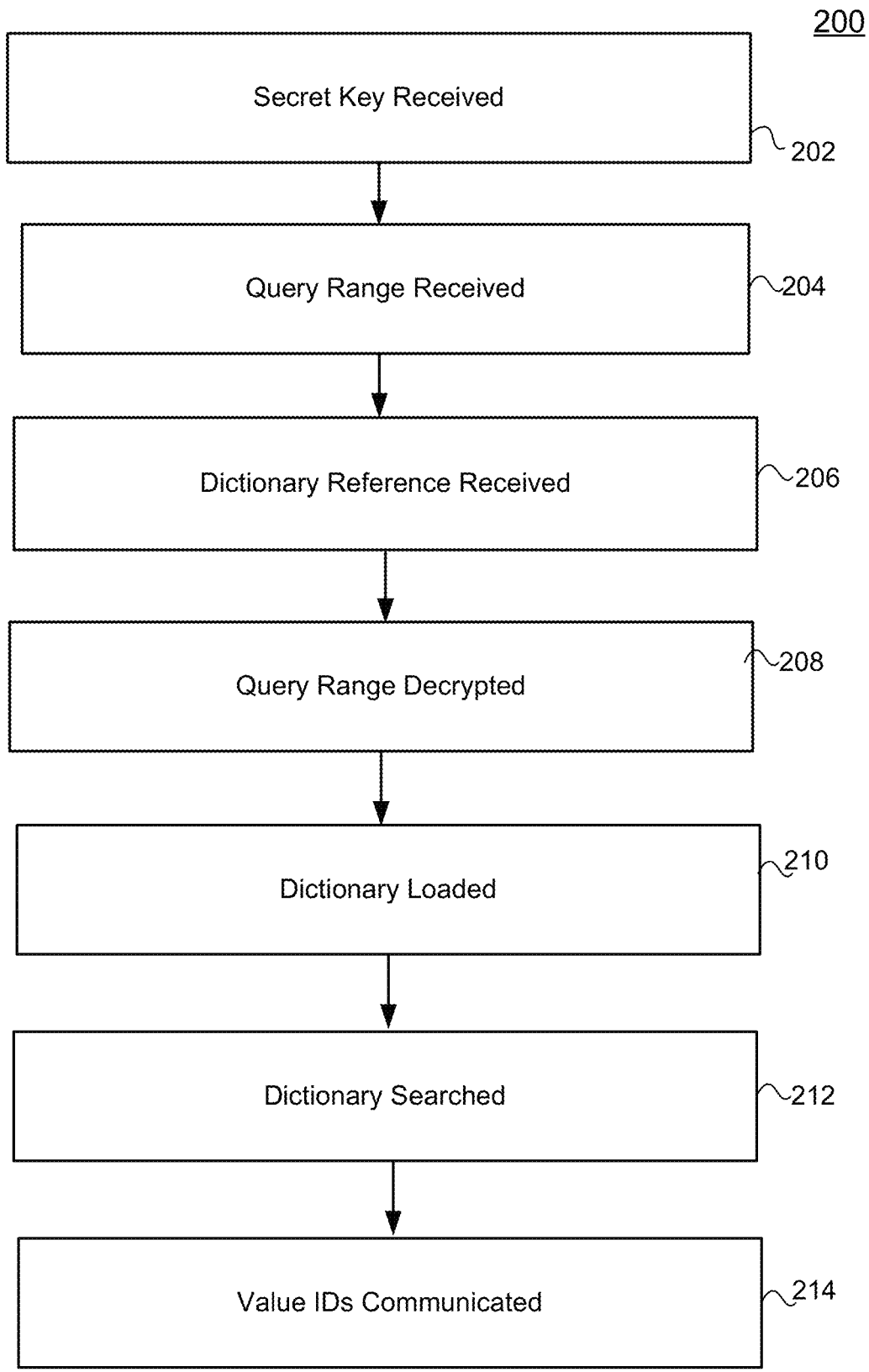
FIG. 2 shows a simplified flow diagram of a method according to an embodiment.

FIG. 2 is a flow diagram showing various actions taken in a method 200 according to an embodiment. At 202, a secure environment receives a secret key.

At 204, the secure environment receives from a query engine located outside of the secure environment, an encrypted query range corresponding to a query issued by a user. At 206 the secure environment receives from the query engine, a reference to a dictionary according to a Encrypted Dictionary and stored in a database.

At 208 the secure environment decrypts the encrypted query range using the secret key. At 210 the secure environment loads the dictionary from the database.

At 212 the secure environment searches the dictionary to produce list of value identifiers corresponding to the first encrypted query range. At 214, the value identifiers are communicated to the query engine for processing, ultimately resulting in a query result.

Details regarding implementation of dictionary encoding in an in-memory database are now provided in connection with the following example.

Example

The following example is taken from the productive implementation of embodiments in the context of a performant, encrypted analytics cloud database that supports large datasets. This example is employed on a column-oriented dictionary encoding based in-memory database created utilizing the MonetDB architecture available from the MonetDB foundation.

Specifically, for this example column-oriented data storage optimizes the processing of analytic workloads. In-memory processing boosts the overall performance, and Dictionary Encoding reduces the storage space overhead of large (encrypted) datasets.

This particular example offers nine different Encrypted Dictionaries from which the Data Owner can select on a column granularity. These offer different tradeoffs regarding aspects including but not limited to:
security (order and frequency leakage);
performance; and
storage consumption.

This particular example integrates into the MonetDB Database Management System (DBMS) that supports query optimization and auxiliary database functionalities, e.g., storage, transaction and database recovery management. Data values are encrypted with probabilistic encryption. The Trusted Computing Base (TCB) represents of only about 1500 lines of code.

As described in detail below, this example was evaluated on real-world data on columns with more than 10 million entries. The processing of encrypted data introduces a sub-millisecond overhead compared to a plaintext version. Furthermore, encrypted columns require less storage than plaintext columns.

Further details regarding this example are now provided.

Traditionally, database systems were optimized for disk storage. Data might be cached to the main memory for performance optimizations, but the primary data resided on disk.

In contrast, in-memory databases permanently store the primary data in main memory and use the disk as secondary storage. A benefit of in-memory databases is the lower access time of main memory compared to disk storage. This speeds up every data access for which disk access would be necessary. Additionally, it leads to shorter locking times in concurrency control, thus less cache flushes and a better CPU utilization.

Hybrid databases also exist. Hybrid databases store only part of the data in main memory. For example, they differentiate between the most accessed (hot) data, which is processed in-memory, and the remaining (cold) data, which is loaded to main memory on demand.

A challenge for in-memory database is the volatility of main memory. Expected or unexpected power loss of the machine clears all data. Therefore, a disk based persistency concept such as transaction logging may be used and is handled carefully to not introduce a performance bottleneck during runtime.

Furthermore, a graceful restart may be employed. Two possibilities are: load all data from disk to main memory at once, or load it on demand Non-volatile random access memory (NVRAM) can be used to handle a power loss, but has higher access times than traditional main memory.

Several commercial and open-source databases support in-memory processing, e.g.:
the HANA in-memory database available from SAP SE of Walldorf, Germany;
Oracle RDBMS from Oracle Corporation of Redwood Shores, Calif.;
VoltDB; and
MonetDB.

Column- and row-oriented database approaches are now discussed. Relational databases (e.g., MySQL and PostgreSQL) may store the two-dimensional tables row-oriented into storage (main memory or disk), i.e., the data is stored consecutively row-by-row. For instance, a database that stores a table with three rows and three columns, first stores all attributes of the first row, then of the second, and finally of the third. Such row-oriented storage may be beneficial for transaction processing, e.g., updating all columns on a few rows or insert new rows.

An alternative concept is to store the data column-oriented, i.e., successive values of each column are stored consecutively and surrogate identifiers are (implicitly) introduced to connect the rows. For the example just mentioned, this results in the three values belonging to the first attributes being stored first, then three for the second, and finally three for the last.

Potential challenges with column-oriented storage may include: (1) so-called tuple-reconstruction is necessary to re-assemble a projection involving multiple attributes; and (2) inserts and updates of a tuple are written to non-contiguous storage locations. However, these issues are not severe in the context of analytical applications, e.g., data warehousing and business intelligence, for several possible reasons.

First, analytical queries often involve a scan on large percentage of all tuples, but only a small subset of all columns. Additionally, bulk loading of data is often used in this context and complex, long, read-only queries are executed afterwards.

An example query is a report on total sales per country for products in a certain price range. Only the few columns that are involved in the query have to be loaded. They can be processed sequentially, which is beneficial as it decreases cache misses of modern CPUs.

When employed together with in-memory databases, column-oriented storage unfolds its full potential, because the number of cache misses are one determining factor of in-memory processing performance. The specific in-memory databases mentioned above also support column-oriented storage.

Column-oriented Dictionary Encoding based In-memory Databases are now discussed. Modern databases may employ data compression mechanisms to exploit redundancy within data.

Various database compression schemes, e.g., Null Suppression, Run-length Encoding and Dictionary Encoding, can be applied to column-oriented databases. The column-oriented databases profit from such compression.

If possible, query operators process directly on compressed data without CPU intensive decompression and decompression is delayed until absolutely necessary. This improves memory bandwidth and algorithms can be optimized by handling fixed-length integers instead of the underlying decompressed data. For instance, equality comparison on integers is severely faster than on (variable-length) strings, because the CPU is optimized for this operation.

Lightweight compression schemes may be preferred to further reduce the overhead of compression and decompression. Dictionary Encoding is a prevalent compression used in column-oriented databases and it is lightweight.

The idea of Dictionary Encoding is to split the original column in two structures: a Dictionary and an Attribute Vector. The Dictionary is filled with all unique values of the column. Every value in this Dictionary is implicitly indexed by a so called ValueID. Values in the original column are replaced by a (small) ValueID that corresponds to the value. The resulting column is denoted as Attribute Vector for which the positions are called RecordIDs.

Figure 3:
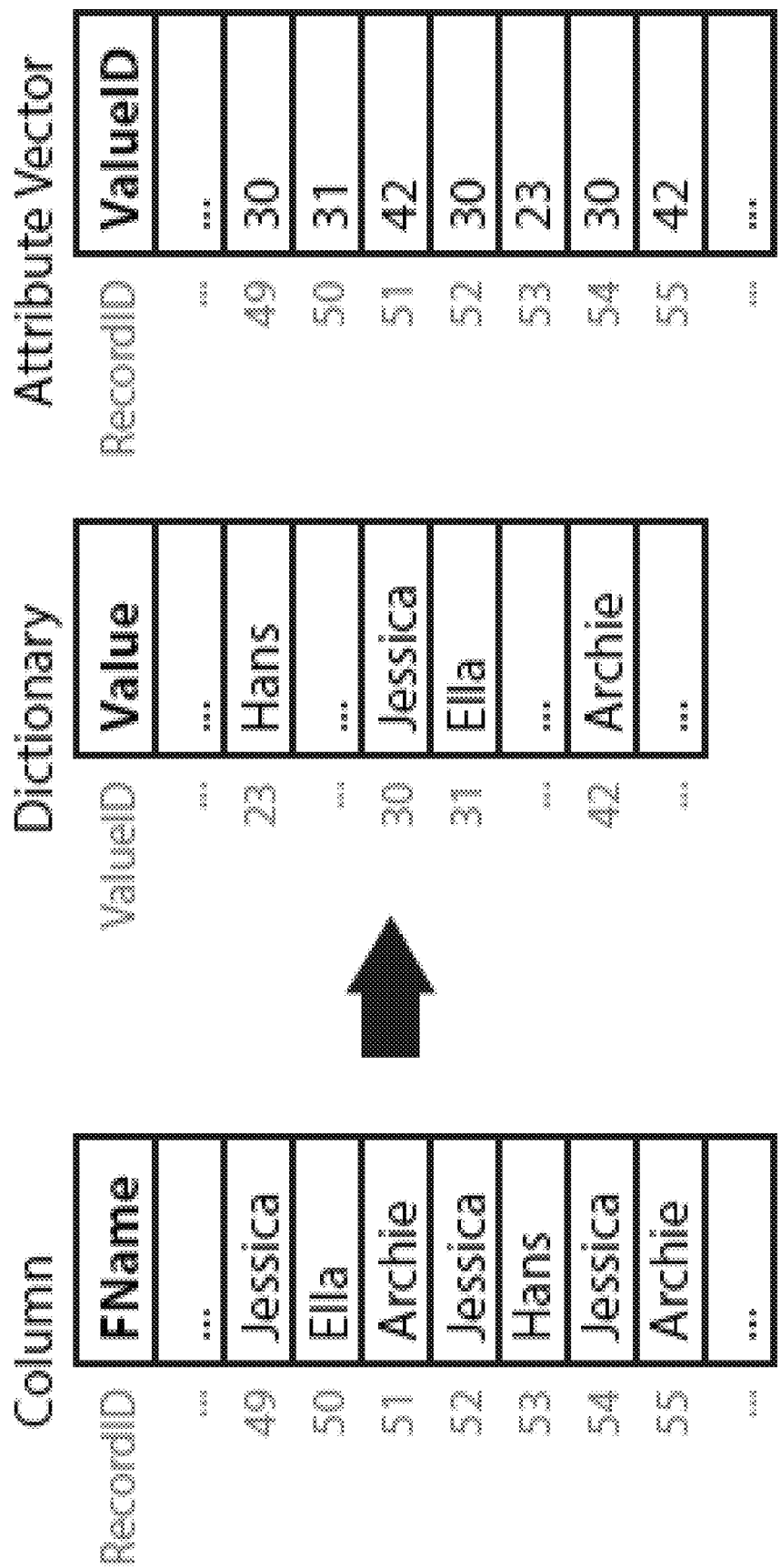
FIG. 3 depicts a simplified example of dictionary encoding.

FIG. 3, presents an example based on a slice of a first name column (FName). For instance, Jessica was inserted at position 30 in the Dictionary and all positions from the original column that contained Jessica are replaced by this ValueID in the Attribute Vector (see RecordIDs 49, 52 and 54).

Dictionary Encoding has the best compression rate if columns contain few unique but many frequent values, because every value has to be stored only once. The real-world data used in the evaluation of this example (discussed below) show that this is a characteristic of many columns in Data Warehouses.

Note that the Attribute Vector requires far less space than the original column. This is because a fixed-length ValueID of i Bits is sufficient to represent $2^i$ different values. The (variable-length) values only have to be stored once in the Dictionary leading to a significant storage benefit in many cases.

For instance, a column that contains 10,000 strings of 10 characters each, but only 256 unique values, requires 256•10B for the dictionary and 10,000•1B for the Attribute Vector. In total, Dictionary Encoding reduced the required storage from 100,000 B to 12,650 B. High compression rates achieved by Dictionary Encoding sparingly use the scarce resource of in-memory databases—the size of main memory.

Searching is now briefly explained, where Dictionary Encoding is used based on an example:
SELECT FName, LName FROM t1 WHERE FName='Archie'.

It is assumed that a table t1 includes the FName column from FIG. 3 and a LName column contains the corresponding last names. LName is also split in a Dictionary and an Attribute Vector.

First, Archie is searched in the Dictionary of FName. The ValueID of Archie is 31. This ValueID is used to scan the Attribute Vector of FName resulting in the RecordIDs 51 and 55. Those RecordIDs are stored in an intermediate result column and they are used to access the Attribute Vector of LName. The ValueIDs at the corresponding positions are used as a second intermediate result column. As a last step, both Dictionaries are used to replace the ValueIDs of the two intermediate result columns with the actual value.

Intel Software Guard Extensions (SGX) are now discussed. Intel SGX is an instruction set extension that was introduced with the Intel SKYLAKE generation. Since then, it is present in almost all Intel CPUs.

The main idea is to provide Trusted Execution Environment (TEE) functionality, i.e., a secure processing area that guarantees confidentiality and integrity protection to code and data. In other words, it enables isolated execution in an untrusted environment.

A high level overview of SGX's features utilized by this example, is now described. Memory isolation is provided. On SGX platforms programs can be divided into two parts: an untrusted part; and an isolated, trusted part.

The trusted part (called enclave in SGX terminology) is located in a dedicated portion of the physical RAM. The SGX hardware enforces additional protection on this part of the memory. In particular, other software on the system (including privileged software such as OS, hypervisor and firmware) cannot access the enclave memory.

The untrusted part is executed as an ordinary process within the virtual memory address space and the enclave memory is mapped into the virtual memory of the untrusted host process. This mapping allows the enclave to access the entire virtual memory of its host process, while the (untrusted) host process can invoke the enclave only through a well-defined interface.

Furthermore, isolated code and data is encrypted while residing outside of the CPU. Decryption and integrity checks are performed when the data is loaded into the CPU.

For Memory Management, SGX dedicates a fixed amount of the system's main memory (RAM) for enclaves and related metadata. This memory may be limited to 128 MB in certain examples, which is used for both SGX metadata and the memory for the enclaves themselves. The latter is called Enclave Page cache (EPC) and is about 96 MB.

The SGX memory is reserved in the early boot phase and is static throughout the runtime of the system. As the number of enclaves which may be loaded and executed in parallel is virtually unlimited, the OS manages the enclave memory dynamically.

The OS can allocate (parts of) the memory to individual enclaves and change these allocations during the runtime of the enclaves. In particular, the OS can swap out enclave pages. SGX ensures integrity, confidentiality, and freshness of swapped-out pages.

Regarding attestation, SGX has a remote attestation feature which allows verification of code integrity and authenticity on a remote system. This is done by hashing (called measuring in SGX terminology) the initial code and data loaded into the enclave.

The authenticity of the measurement as well as the fact that the measurement originates from a benign enclave is ensured by a signature, provided by SGX's attestation feature. This signature is provided by a component of SGX, called quoting enclave (QE).

The QE accepts only measurements from the hardware and the hardware ensures that only correct enclaves are measured. The measurement can be provided to an external party to prove the correct creation of an enclave.

Furthermore, the remote attestation feature allows for establishing a secure channel between an external party and an enclave. This secure channel can be used to deploy sensitive data directly into the enclave without the hardware owner having access to it.

Figure 4:
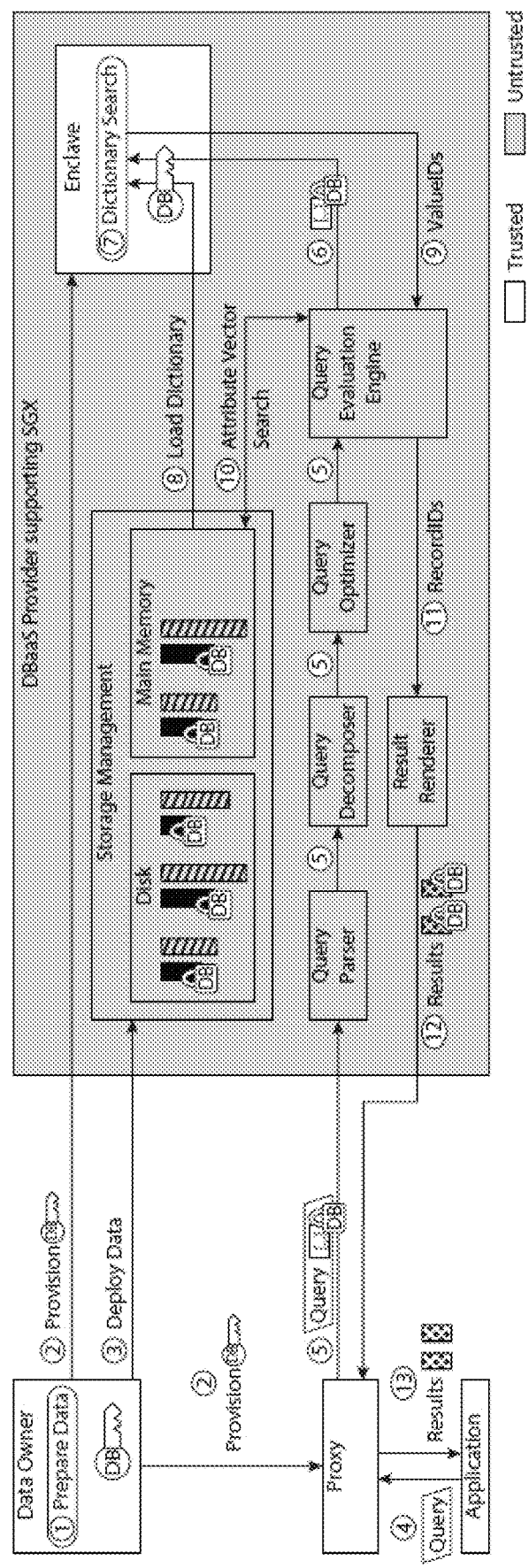
FIG. 4 presents a high level overview of an embodiment of an in-memory database featuring dictionary encoding, according to a specific example.

A high level design for the instant example is presented in FIG. 4. This figure distinguishes between trusted and untrusted entities.

The main untrusted entity is a DBaaS provider, i.e., a cloud provider running a column-oriented in-memory database in the cloud. This DBaaS provider deploys the secure cloud database on an SGX enabled server.

Only a minor portion of the database functionality is running inside the enclave. The rest is running in an untrusted environment.

It is assumed that a trusted Data Owner wants to outsource its data, and a trusted Application queries data. Requests from the trusted Application and all responses to it are passed through a trusted Proxy.

Initially, the Data Owner prepares its data locally (see step 1 in FIG. 4). Each column of the Data Owner's legacy system it separated into a Dictionary and Attribute Vector as explained above.

Then, the Data Owner selects a dictionary encoding per column. This can be a regular plaintext dictionary encoding or an Encrypted Dictionary. This example offers nine (9) different Encrypted Dictionaries with different tradeoffs regarding security, performance, and storage consumption.

The plaintext columns are not processed any further, but the other columns are processed in two steps. First, the Dictionaries and Attribute Vectors are modified depending on the selected Encrypted Datatype. Second, all Dictionary entries are encrypted individually with randomized encryption under a secret key.

In a next step (2), the Data Owner provisions the secret key to the proxy and the enclave. A secure out-of-band deployment is used for the proxy.

SGX's attestation feature is used to authenticate the enclave and to establish a secure connection to it (as described above). This secure connection is used to deploy the secret key to the enclave.

As a last step of the one-time setup, the Data Owner deploys the data (i.e., the Dictionaries and Attribute Vectors) to the DBaaS provider in step (3). As example features a hybrid in-memory database, the Storage Management of the in-memory database stores all data on disk for persistency and additionally loads (part of) it into main memory.

From this point on, the Application can send an arbitrary number of queries to the database—step (4).

Such queries may include equality selects, anti-equality selects, greater than selects (inclusive and exclusive), less than selects (inclusive and exclusive), and range selects (inclusive and exclusive). Other query functionalities, e.g., counts, aggregations, and average calculations, could be added.

Queries are routed through the Proxy, where they are intercepted, converted to range selects, and range start and end are encrypted with randomized encryption.

Query types can be converted to range selects. This conversion has the additional benefit that the untrusted server cannot differentiate query types. And, due to randomized encryption, the untrusted server also cannot learn if the values were queried before.

The resulting encrypted query is passed to the query pipeline of the DBaaS provider—see step (5). The query pipeline differs from DBMS to DBMS. But, on a high level the query pipeline processes the query as explained in the following.

First, a Query Parser validates the query syntax and checks the presence of the requested tables and columns. A Query Decomposer translates the high-level query language (e.g., SQL) to a set of algebraic operations to be performed on each column, which the database kernel can understand.

A Query Optimizer evaluates the possible query plans and decides on the most efficient execution. It additionally loads the respective column to main memory, if they only reside on disk.

Finally, the query plan is shared with a Query Evaluation Engine. The Query Evaluation Engine only processes columns for which the incoming query contains a filter expression (i.e., a range query is performed on that column). For these columns, it obtains the metadata and processes the columns one after another according to the query plan.

Every plaintext column that needs processing is handled regularly as defined by the underlying DBMS. The columns of an Encrypted Dictionary are processed in two steps: Dictionary search in the enclave and Attribute Vector search in the untrusted realm.

The processing begins with the Query Evaluation Engine passing the encrypted range and a reference to the corresponding Dictionary to the enclave—see step (6).

The enclave decrypts the range and performs a search in the Dictionary by individually loading and decrypting the appropriate values—see steps (7) and (8).

In step (9) the enclave returns a list of ValueIDs, which the Query Evaluation Engine uses to perform a search in the Attribute Vector—see step (10).

The resulting RecordIDs of all filtered columns are passed to a Result Renderer in step (11). RecordIDs might be combined or deducted if an "and" or "or" filter was performed on multiple columns of one table.

The resulting RecordIDs are used to obtain the encrypted values from the corresponding dictionaries. The RecordIDs of the filters are also used to retrieve the corresponding encrypted values for columns that were only selected.

The Result Renderer adds results to a result set and passes it back to the Proxy in Step (12). The result set is decrypted and forwarded to the application in step (13).

Notably, only a small part of the query processing is performed inside the trusted enclave. There is no need to change auxiliary database functionalities such as persistency management, multiversion concurrency control, or access management. Still, the complete processing is protected.

Assumptions and the attacker model are now discussed. The attacker model considers the Data Owner, Application, and Proxy as trusted.

On the server side an honest-but-curious attacker is assumed. That is, the attacker is a passive attacker who follows the protocol, but tries to gain as much information as possible.

It is assumed that the DBaaS provider runs this example on an Intel SGX enabled system. In accordance with alternative embodiments, however, SGX could be replaced by any other TEE that provides the required capabilities, e.g.:
integrity
confidentiality protection of code and data,
remote attestation;
secure data provisioning.

The code is assumed to not have intentional data leakage. Nevertheless, SGX may be vulnerable to various side-channel attacks, e.g., cache attacks, exploiting timing effects, or page faults. Embodiments may be designed to have minimal enclave code, wherefore the protections should be easy to integrate with minor impact on performance.

Besides the code and data that is protected by the TEE, the attacker has full control over all software running at the DBaaS provider. Among others, this includes the operating system, the firmware, and the DBMS.

As a result, the attacker has access to data stored on disk and main memory, and is able to observe the access pattern to them. Additionally, the attacker can track all communication between the enclave and resources outside of it and all network communication between the proxy and the DBMS.

Note that this includes the incoming queries in which only the data values are encrypted. The rest of the query is plaintext.

It is assumed that the attacker targets each database column independently, i.e., he does not utilize correlation information to target columns. Hardware attacks on the TEE are not considered. Denial of Service (DoS) attacks are also out of scope because it is assumed that the cloud provider has commercial interest not to deny the services. The same is true for the network connection between the client and DBaaS provider.

Notations and definitions are now presented, followed by a definition of Probabilistic Authenticated Encryption (PAE) and Hardware Secured Dictionary Search (HSDS).

For dictionary encoding, a column C has C. # v values, i.e., $C=(C.v_0, C:v_{(C. \# v-1)})$. un(C) denotes the number of unique values in C, and oc(C.v) the number of occurrences of the same value v∈C.

Dictionary encoding splits every column C in two structures: a Dictionary D and an Attribute Vector AV. D can be represented as an array containing D. # v values: $D=(D.v_0, \ldots, D.v_{(D. \# v)-1})$. In a standard Dictionary, D. # v matches un(C) of the column that was split. The index i of a Dictionary entry $D.v_i$ is also the ValueID (vid) that corresponds to this value. We use an equal notation for the Attribute Vector AV belonging to the column C. It contains AV. # vid ValueIDs matching the number of entries in C (C. # v). AV.vid is the entry at position j in AV and the index j is also its RecordID (rid).

For ease of notation, we sometimes ignore the split of a column C In this case, $C.v_i$ refers to the value that is obtainable by accessing $AV.vid_i$ and locating the corresponding value in D.

A Probabilistic Authenticated Encryption (PAE) comprises three polynomial-time algorithms: PAE=(PAE_Gen ($1^\lambda$), PAE_Enc(SK, IV, v), PAE_Dec(SK, c). It provides confidentiality, integrity and authenticity. PAE_Gen takes a security parameter $1^\lambda$ as input and generates a secret key SK. PAE_Enc takes the key SK, a random initialization vector IV and a value v as input and returns a ciphertext c. The unencrypted IV is part of c. PAE_Dec takes the key SK and a ciphertext c as input and returns v iff v was encrypted with PAE Enc under the initialization vector IV and the key SK. Otherwise, it returns ⊥. Note that the IV is not a parameter of PAE_Dec, because it is part of c. PAE is an authenticated IND-CCA secure encryption, e.g., AES-128 in GCM mode.

Hardware Secured Dictionary Search (HSDS) is a concept to search data in an encrypted column-oriented Dictionary Encoding based in-memory Databases.

Definition 1 (HSDS): A Hardware Secured Dictionary Search (HSDS) is a tuple of six polynomial-time procedures (HSDS_Setup; HSDS_EncDB; HSDS_DecRes; HSDS_Process-Query; HSDS_DictSearch).

The following procedures are executed at the Data Owner:
$SK_{DB} \leftarrow$ HSDS_Setup($1^\lambda$): Take the security parameter λ as input and output a secret key $SK_{DB}$.
EDB←HSDS_EncDB($SK_{DB}$, PDB, dt): Take the secret key $SK_{DB}$, the plaintext database PDB and column Dictionary Encodings dt as input. Output an encrypted database EDB.

The following procedures are executed at the Proxy:
eQ←HSDS_EncQuery($SK_{DB}$, Q): Take the secret key $SK_{DB}$ and the plaintext query Q as input. The query contains selects and filters on multiple columns of one table. Output an encrypted query eQ in which all values are encrypted.
C←HSDS_DecRes($SK_{DB}$, eC): Take the secret key $SK_{DB}$ and multiple encrypted columns eC as input. Output plaintext columns C.

The following are executed at the server on untrusted hardware:
eC←HSDS_ProcessQuery(eQ): Take the encrypted query eQ as input. Output a set of encrypted columns eC.

The following are executed at the server on secure hardware:
vid←HSDS_DictSearch(τ, eD): Take the encrypted range τ and the encrypted column eC as input. Output a set of ValueIDs vid.

The correctness of a HSDS is defined as follows. Definition 2 (Correctness). Let D denote a HSDS-scheme consisting of the six algorithms described in Definition 1. Given an honest-but-curious attacker, we say that D is correct if for all λ∈N, for all $SK_{DB}$ output by HSDS_Setup($1^\lambda$), for all plaintext databases PDB and datatypes dt used by HSDS_EncDB($SK_{DB}$, PDB, dt) to output EDB, for all queries Q used by HSDS_EncQuery($SK_{DB}$, Q) to output eQ, for all eC output by HSDS_ProcessQuery(eQ), the columns C output by HSDS_DecRes($SK_{DB}$, eC) are the result set matching the query Q.

The previous FIG. 4 offered a description of embodiments that support search on encrypted data. It is deployable on any existing column-oriented Dictionary Encoding based in-memory Databases. Only the Dictionary search is deployed inside an Intel SGX enclave (or another comparable TEE).

Further query processing of the underlying DBMS such as:
  query parsing,
  query decomposition, and
  query optimization, are unchanged and are performed in the untrusted realm.

The same is true for auxiliary database functionalities such as,
  storage,
  transaction, and
  database recovery management.

The following description concentrates on the query processing steps that are influenced by embodiments by introducing how embodiments initialize a correct HSDS scheme. Afterwards, we describe the characteristics of our nine Encrypted Dictionaries, which provide different tradeoffs regarding order leakage, frequency leakage and storage overhead.

It is noted that embodiments can handle an arbitrary number of selects, filters, and columns of different datatypes. Even encrypted and plaintext columns can be handled in the same query. For ease of explanation, we only consider queries with one column that is selected and filtered. The datatype of this column is one of our nine Encrypted Dictionaries.

Encrypted query processing according to this example differs based on the selected Encrypted Dictionaries during system setup and during runtime.

System setup involves the Data Owner, the Proxy, and the DBaaS provider. However, only the Data Owner has an active role by executing the following two steps in order.

1) $SK_{DB} \leftarrow$ HSDS Setup($1^\lambda$). The Data Owner uses $\lambda$, to execute PAE Gen and outputs $SK_{DB}$=PAE_Gen($1^\lambda$). Then, the Data Owner shares $SK_{DB}$ with the DBaaS server's enclave using the secure channel that is established during successful remote attestation (described above). Additionally, $SK_{DB}$ is deployed at the Proxy via a secure out-of-band mechanism.

2) EDB$\leftarrow$HSDS EncDB($SK_{DB}$, PDB, dt). Afterwards, the Data Owner takes its plaintext database PDB and defines the Dictionary Encoding (dt) of each column. A plaintext Dictionary Encoding or any of the nine Encrypted Dictionaries defined later can be chosen freely. The nine Encrypted Dictionaries provide different tradeoffs regarding security, performance and storage consumption and should be selected considering the sensitivity of the columns. All columns with a plaintext Dictionary Encoding are split into a Dictionary and an Attribute Vector and added to the encrypted database EDB. All columns of an Encrypted Dictionary are also split, but the Dictionary and the Attribute Vector are further processed. The processing depends on the specifics of the concrete Encrypted Dictionary, but it involves ordering the Dictionary in a specific manner (to hide the data order) and potentially to add duplicates to the Dictionary (to hide the frequency). Details are also presented later. The Attribute Vector has to be modified according to the changes in the Dictionary to still represent the same values as the original column. After this processing, the Data Owner derives an individual key per Dictionary ($SK_D$) using the master database key $SK_{DB}$ and the table and column name Each value in the dictionaries is encrypted individually with PAE_Enc under $SK_D$ belonging to the dictionary and a random IV. The resulting Dictionaries and Attribute Vectors are added to EDB.

As a last step of the setup, the Data Owner uses the import functionality of the DBaaS provider to deploy EDB.

The runtime stage of encrypted query processing is now discussed. The runtime starts with the Application issuing an SQL query Q to the Proxy. W.l.o.g. we assume that Q selects and filters one column. The filter can be an equality select, an anti-equality select, a greater than select (inclusive or exclusive), a less than select (inclusive or exclusive), and a range select (inclusive or exclusive). Embodiments could also handle other query functionalities, e.g., counts, aggregations, and average calculations.

eQ$\leftarrow$HSDS EncQuery($SK_{DB}$, Q). As a first step of HSDS_EncQuery, the Proxy converts all possible filters to a range select. Note that this transformation is always possible. For instance, the SQL query SELECT FName FROM t1 WHERE FName<'Ella' is converted to SELECT FName FROM t1 WHERE FName>=$-\infty$ and FName<'Ella' where $-\infty$ is a placeholder for a universal minimal value. $\infty$ is used if a placeholder for a maximal value is required. We denote the range of the range select as $R=(R_s, R_e)$ in the following and do not differentiate between inclusive and exclusive ranges in our notation. Next, the Proxy derives $SK_D$ using the master database key $SK_{DB}$ and the table and column name. Then, it encrypts $R_s$ and $R_e$ with PAE Enc($SK_D$, IV, •) using random initialization vectors. The encrypted range is denoted as $\tau=(\tau_s, \tau_e)$. In the example from above, the resulting encrypted query eQ is SELECT FName FROM t1 WHERE FName>=PAE_Enc($SK_{DB}$, $IV_1$, $-\infty$) and FName<PAE_Enc($SK_{DB}$, $IV_2$, 'Ella'). The Proxy sends eQ to the DBaaS provider. Note that the utilization of a Probabilistic Authenticated Encryption results in range queries that are different, even if the queried range actually is equal.

eC$\leftarrow$HSDS_ProcessQuery(eQ). The encrypted query eQ is handled by a processing pipeline that is specific to the underlying DBMS. The pipelines try in various ways to optimize the performance of the query execution. The only assumption we have is that it finally extracts a (eD, AV, $\tau$) tuple from eQ, i.e., an encrypted Dictionary, a plaintext Attribute Vector and an encrypted range filter that has to be executed. The tuple is passed to the Query Evaluation Engine, which performs the range query on the data in two steps.

First, it calls the TEE function HSDS_DictSearch($\tau$, eD). How this search is performed inside the enclave depends on the Encrypted Dictionary of the filtered column, but the enclave always returns a list of ValueIDs (vid). We describe the details later below. This is the only point where the DBMS interacts with the TEE.

Second, the Query Evaluation Engine scans the whole Attribute Vector AV for the passed ValueIDs (vid). Every value AV.vid$\in$AV has to be compared to all values in vid, which potentially results in many comparisons. However, integer comparisons are used at that point, which improves the performance and the scan is highly parallelizable. Beside a minor tweak explained later, this function is equal for all Encrypted Dictionaries. This step results in a list of RecordIDs rid of all matching entries in AV.

This list would be used to prefilter another column in the same table, if a range query should also be executed on it. Additionally, it would be used if a select is performed on another column. In our case, the single encrypted result column eC (=eC) is created by undoing the split in Dictionary and Attribute Vector on all entries in rid, i.e., eC= (D.$v_j$|j=AV.vid$_i \wedge i \in$rid). Finally, eC is enriched with column metadata—table and column names—and passed back to the Proxy.

C$\leftarrow$HSDS_DecRes($SK_{DB}$, eC). The Proxy receives (in our example) one encrypted column eC from the DBaaS provider and uses the attached column metadata to derive the column specific key $SK_D$. Every entry in eC is decrypted individually with $SK_D$ resulting in one plaintext column C. C (=C) is passed back to the Application for which the whole process is transparent.

Encrypted Dictionaries according to this specific example are now described. An objective of embodiments is to offer the Data Owner a flexible tradeoff between performance, security, and storage consumption.

In this particular example, nine different Encrypted Dictionaries are offered. FIG. 5 presents an overview of the nine Encrypted Dictionaries, denoted as ED*.

The Data Owner can choose during the setup phase which Encrypted Dictionary should be used on a column granularity. The Encrypted Dictionaries are designed in two different dimensions of security:

(1) level of order leakage; and
(2) level of frequency leakage.

In other words, how much can an attacker learn about the encrypted data regarding its order, and how much about its frequency. Both leakages can be used for different attacks on encrypted data.

The Encrypted Dictionaries are denoted as ED*.° with * and ° represent three different frequency and order leakage levels, respectively. The three Encrypted Dictionaries ED*.1 provide tradeoffs for order leakage, but leak the frequency. The three ED*.2 reduce the frequency leakage under different order leakage tradeoffs. The three ED*.3 suppress the frequency leakage.

The nine Encrypted Dictionaries are handled differently at three positions:
(1) during creation of the encrypted Dictionaries at the Data Owner (HSDS_EncDB),
(2) during Dictionary search inside the enclave (HSDS_DictSearch), and
(3) during the Attribute Vector search for the ValueIDs returned by HSDS_DictSearch.
Those details are the focus of the following discussion, as the remaining processing is the same for all Encrypted Dictionaries.

ED*.1 is now described in detail. This includes three different Encrypted Dictionaries with three different levels of order leakage: ED1.1, ED2.1, and ED3.1. For these the Dictionary includes each value only once, and thus provides the ideal compression rate possible with Dictionary Encoding.

A drawback is that an attacker can combine the Dictionary and Attribute Vector to a column C Every value in C is encrypted (with probabilistic encryption), but the attacker still learns the frequency of each encrypted value. This issue is addressed in the description of the Encrypted Dictionaries ED*.2 and ED*.3.

For ED1.1., as mentioned before the Data Owner splits all columns of PDB into Dictionary D and Attribute Vector AV in HSDS_EncDB. The essential idea of ED1.1 is to sort D lexicographically during the Dictionary creation of this Encrypted Dictionary (HSDS_EncDB_1.1). The ValueIDs in AV are set accordingly. FIG. 6 presents an example of dictionary encoding for ED1.1.

Figures 7, 8:
FIG. 7 shows a procedure that presents the function executed inside the enclave for one of the datatypes of the example.
FIG. 8 illustrates dictionary encoding for one of the datatypes of the example.

FIG. 7 shows a Procedure 1. That Procedure 1 presents HSDS_DictSearch_1.1, the function that is executed inside the enclave for ED1.1. The function gets an encrypted range τ and an encrypted Dictionary eD as input. First it uses the table and column name to generate $SK_D$ and uses it to decrypt the start and end of the range individually. Then, it performs a leftmost and rightmost binary search for the start and the end of the range, respectively. These binary searches are performed almost like a textbook binary search: compare the search value to the middle element of a given array; the half in which the search value cannot be in is not considered anymore; continue the search in the other half with the middle element and repeated this until the (leftmost or rightmost) search value is found or its inexistence is certain. The only difference is that the middle value is stored in untrusted memory and it is encrypted in our case.

The enclave loads it into the enclave and decrypts it there before comparing it with the search value. This results in a logarithmic number of loading, decrypting and comparing operations (relative to the size of D). The leftmost and rightmost search, together with the information if a value was found or not (which is not mentioned in the procedure) is necessary to handle cases in which the value is not present.

As a minor deviation from the generic HSDS_DictSearch, HSDS_DictSearch_1.1 returns ($eD.v_{start}$, $eD.v_{end}$)—the Dictionary indices where the searched range starts and ends—instead of all matching ValueIDs (vid).

Note that only small, constant enclave memory is required for this operation. This is independent of the size of the Dictionary. The same is true for HSDS_DictSearch of all other Encrypted Dictionaries.

As mentioned before HSDS_ProcessQuery uses the result of HSDS_DictSearch to linearly scan AV. The explained deviation has the benefit that HSDS_ProcessQuery only has to check for each value if it is between $eD.v_{start}$ and $eD.v_{end}$ instead of comparing it with every matching value. This has a significant performance impact especially if the distance between $eD.v_{start}$ and $eD.v_{end}$ is large. The remainder of HSDS_ProcessQuery is executed as described before.

ED1.1 has the highest order leakage, because an attacker knows what the smallest (and biggest) value is, although the data is encrypted with PAE.

For ED2.1., the fundamental idea is to sort and randomly wrap D during HSDS_EncDB_2.1. In other words, the ValueIDs are rotated by a value we denote as WrapIndex modulo D. # v. FIG. 8 illustrates an example in which WrapIndex 3 is used. For instance, "Jessica" would have the ValueID 2 in a sorted Dictionary. In the wrapped Dictionary, the ValueID is 1 (=(2+3)% 4).

The Data Owner encrypts the WrapIndex with PAE under the $SK_D$ and a random IV. The resulting encWrapindex gets attached to EDB as metadata of the column.

The processing inside of the enclave (HSDS_DictSearch_2.1) is more complex in this case. This is illustrated in Procedure 2 shown as FIG. 9.

Besides the decryption of the range, encWrapindex is also decrypted. Then, a special variant of binary search is called for the start and the end of the range, which we explain below. The searches result in a minimal index $vid_{min}$ and a maximal index $vid_{max}$, which are analyzed further. If both are lower or higher than the WrapIndex, the function returns one range from $vid_{min}$ to $vid_{max}$. The only other possibility is that $vid_{min}$ is above WrapIndex and $vid_{max}$ is below. $vid_{min}$ equal eD. # v implies that the range start was not found in D, but it is higher than the value at $D.v_{(D.\#v)-1}$. The ValueID range from zero to $vid_{max}$ is returned in this case. In the last case, $vid_{min}$ is bigger than $vid_{max}$, which indicates that the result range goes over the wrap of the ValueIDs. Therefore, two ValueID ranges have to be returned: (0, $vid_{max}$) and ($vid_{min}$, eD. # v−1).

For columns of type ED2.1, HSDS_ProcessQuery has to check for every value AV.vid∈AV if it is between the one (or two) ValueID ranges.

Procedure 3 shown in FIG. 10 presents the details of the special binary search with slightly different handling of the range start and end. The goal is to perform a binary search that has the same access pattern as a binary search on a Dictionary that is not wrapped. The reason is that a regular binary search that simply accesses the rotated middle by considering the WrapIndex directly leaks the WrapIndex. This would completely thwart the additional protection.

The special binary search uses an encoding that converts arbitrary values to an integer representation preserving the lexicographical data order. This is done by converting every character individually to an integer of a fixed length and concatenating them to one result integer. For instance, the encoding of AB would be 3334 and BA would lead to 3433. The encoded integers are additionally padded to the maximal length of any possible plaintext. For a maximal length of 5, the encoded and padded version of AB would be 3334000000. The maximal width of a column is clear in most databases as the Data Owner has to define it during the definition of a column. For instance, the Data Owner defines that a string column can contain 30 characters or a 64 bit integer. The enclave is able to access this column metadata.

After initializing the low and high value of the search, the procedure encodes the highest value that D could contain resulting in N. This is possible, because the maximal width of the column is known. Next, the first value in D is decrypted and encoded resulting in r and the search value sVal is also encoded. r is subtracted from sVal and the result is taken modulo N if the WrapIndex is not zero. As WrapIndex is random, this could happen. All middle values accessed during the search are handled in the same way.

Note that the encoding is done on the fly and results are not stored. The runtime overhead is small for this operation and it saves storage space.

The wrapping alleviates the data order leakage, because an attacker does not know where the smallest (and biggest) value is by looking at D. Note that the wrapping of each column is independent, as the Data Owner draws a random WrapIndex per column.

Turning to ED3.1., the Dictionary is unsorted. During HSDS_EncDB_3.1, every value from the PDB is inserted to D at a random position. AV is created to match the original column. FIG. 11 shows an example for this Encrypted Dictionary ED3.1.

An advantage of this Encrypted Dictionary ED3.1. is that it hides the data order completely. However, it has a disadvantage in that it prevents the usage of any search with logarithmic runtime during HSDS_DictSearch_3.1.

Instead, a linear scan over all values in eD has to be performed, after decrypting τ with $SK_D$. This is shown in Procedure 4 of FIG. 12. This involves loading each entry into the enclave, decrypting it and checking if it falls into the range. The result is a list of ValueIDs vid.

HSDS_ProcessQuery has to compare every RecordID AV.vid with every value in vid. The number of these comparisons becomes large if vid contains many ValueIDs. However, integer comparisons are used at that point and it is highly parallelizable.

ED*.2 is now described. Above, we looked at three different Encrypted Dictionaries (ED*.1) with different levels of order leakage. Now, we explain the present frequency leakage and examine a way to alleviate it. We present a parameterizable mechanism that can be applied to ED1.1, ED2.1 and ED3.1 during HSDS_EncDB. Afterwards, we explain minor modifications that are necessary to HSDS_DictSearch_X:1. This results in three additional Encrypted Dictionaries: ED1.2, ED2.2 and ED3.2.

An insight is that each encrypted dictionary eD contains encrypted values eD.v, but every plaintext value is present only once with a unique ValueID. An attacker can easily calculate how often $eD.v_i$ is present in the column by scanning AV for the ValueID i. This frequency leakage might be used to reveal the underlying plaintext values. As a countermeasure, we propose to insert a plaintext multiple times into D during HSDS_EncDB based on a probabilistic mechanism, which we call Uniform Frequency Smoothing (UFS).

For HSDS_EncDB, the Data Owner splits every C∈PDB into a Dictionary D and an Attribute Vector AV. C has un(C) unique values and so far, every value was inserted into D exactly once. Now, the Data Owner performs a random experiment for every unique value in C to determine how often it is inserted into D and how often each of those "duplicates" are referenced by AV. We say that a plaintext value v is split into multiple buckets and every bucket has a specific size.

As input to the random experiment, the Data Owner counts the number of occurrences of the same value v∈C (oc(C.v)). Additionally, he defines the maximal size of a bucket ($bs_{max}$).

Figures 13, 14:
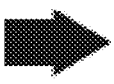
FIG. 13 presents a procedure for random experiments.
FIG. 14 illustrates dictionary encoding for one of the datatypes of the example.

Procedure 5 shown in FIG. 13 presents the random experiments in detail. The random size for an additional bucket is picked from the discrete uniform distribution U{1, $bs_{max}$} until the total size is above oc(C.v). The size of the last bucket is then set so that the total size matches oc(C.v). The experiment returns the bucket sizes ($bs_{sizes}$) and how many buckets were chosen (# bs).

According to the # bs, the Data Owner inserts duplicates into D. Then, he scans C for all duplicates. For every matching C.vi, he randomly inserts one of the # bs possible ValueIDs into $AV.vid_i$. At the same time, he considers how often each ValueID can be used, which is defined by $bs_{sizes}$.

For ED1.2 the values in D get sorted afterwards. For ED2.2 they get sorted and wrapped. For ED2.3 they get shuffled randomly. The Attribute Vector is adjusted accordingly. FIG. 14 shows an example for ED2.2 with bsmax=3 and WrapIndex=1.

Finally, all values in D are encrypted with PAE.Enc. As the initialization vector is picked randomly for each value, the ciphertexts is different, even if the plaintexts are equal.

Regarding HSDS_DictSearch, only one Dictionary search inside of the enclave has to be adjusted to support the presence of duplicates in the Dictionaries. HSDS_DictSearch_1.2=HSDS_DictSearch 1.1, because leftmost and rightmost binary search is already used. Therefore, it automatically finds the start and end of potential duplicate blocks. Also, HSDS_DictSearch_3.2=HSDS_DictSearch_3.1, because the linear scan finds all duplicates in D and adds them to vid.

HSDS_DictSearch_2.2 gets more complex, because it has to handle corner cases. The reason is that a plaintext value of the last and first entry in D might be equal (as in the example presented in FIG. 14). The postprocessing of $vid_{min}$ and $vid_{max}$ in HSDS_DictSearch_2.2 becomes more complex for that reason.

$bs_{max}$ impact is now discussed. The Data Owner can freely choose $bs_{max}$ on a column granularity according to his requirements. The chosen value influences multiple dimensions:

(1) storage cost,
(2) performance, and
(3) frequency leakage.

For instance, a small $bs_{max}$ leads to many duplicate entries inside D. First, those duplicates have to be stored, which negatively impacts the compression rate provided by Dictionary Encoding. Second, more data loading, more decryptions and more comparisons are necessary during HSDS_DictSearch inside the enclave. ED1.2 and ED2.2 only have a logarithmic growth in this regard as binary search is used. The linear scan in ED2.3 is influenced by it. Third, the frequency leakage is low, because the frequencies are smoothed as the number of occurrences for each ValueIDs is guaranteed to be between 1 and (a low) $bs_{max}$. A large $bs_{max}$ has the opposite effects.

ED*.3 is now discussed. We just presented UFS, a concept to smooth the frequency leakage. Now, we discuss Perfect Frequency Smoothing (PFS), which completely prevents it. The idea is straightforward: add an own entry into the Dictionary for every value in the original column. This can be employed for ED1.1, ED2.1, and ED3.1 during HSDS_EncDB leading to ED1.3, ED2.3, and ED3.3.

The corresponding Dictionary searches are equal as in ED*.2, because the number of duplicates is just "higher". In fact, PFS can be interpreted as a special case of UFS by setting $bs_{max}$ to 1. For this reason, the advantage and disadvantages are equivalent to the ones regarding a small $bs_{max}$. Especially the compression provided by Dictionary Encoding is not present anymore, but the frequency of every ValueID is perfectly equal.

Dynamic data aspects are now described. So far, we only discussed static data that is prepared by the Data Owner and then uploaded to a DBaaS provider, which uses the in-memory database featuring dictionary encryption. This is sufficient for most analytical scenarios, because bulk loading of data is often used in this context and complex, read-only queries are executed afterwards.

In the following, we present an approach on how to allow the insertion of data if required. We propose to utilize a concept called Delta Store (or Differential Buffer) to permit write queries, e.g., inserts, deletions, and updates. The idea is to split the database (specifically each column) into a read optimized Main Store and a write optimized Delta Store.

Updates in a column do not change existing rows. Instead, all data changes are performed in the Delta Store. New values are simply appended. Updated values are handled by using a validity vector for the two storage concepts. This vector stores if the value is valid or not for each entry. Deletions are realizable by an update on the validity bit. The overall state of the column is the combination of both stores. Thus, a read query becomes more complex: it is executed on both stores normally and then, the results are merged while checking the validity of the entries. The Delta Store should be kept orders of magnitudes smaller than the Main Store to efficiently handle read queries. This is done by periodically merging the data of the Delta Store into the Main Store.

For particular embodiments, any Encrypted Dictionary can be used for the Main Store and ED3.3 may be employed for the Delta Store. New entries can simply be appended to a column of type ED3.3 by reencrypting the incoming value inside the enclave with a random IV. A search in this Delta Store is done by performing the linear scan as defined by HSDS_DictSearch_3.3. As a result, neither the data order nor the frequency is leaked during the insertion and search. A drawback of ED3.3 is that it has a high memory space overhead and low performance. However, the periodic merges mitigate this problem. The enclave has to handle the merging process: reencrypt every value in D, rewrap the values for columns of type ED2.° and reshuffle for ED3.°. The process has to be implemented in a way that does not leak the relationship between values in the old and new Main Store.

Specific implementation of this illustrative example is now described. For our experiments, we implemented a prototype based on MonetDB, an open-source column-oriented in-memory DBMS. MonetDB focuses on read-dominated, analytical workloads and therefore fits our usage scenario. It is a full-fledged relational DBMS, which is designed to exploit the large main memory of modern computer systems for processing and it utilizes disk storage for persistency.

MonetDB uses a variant of Dictionary Encoding for all string columns. As contrasted with the encoding described previously above, MonetDB employs a more complicated approach.

The attribute vector still contains offsets to the Dictionary, but the Dictionary contains data in the order it is inserted (for non duplicates). It is fully duplicate eliminated if it is small (below 64 kB) and a hash table and collision lists are used to locate entries. The collision list is not used anymore if the Dictionary grows bigger. As a result, the Dictionary might store values multiple times. Overall, the developers have created a Dictionary that is read-optimized and also directly supports write operations.

The front-end query language of MonetDB is SQL. All queries are parsed, validated, and translated to a back-end query language called MonetDB Assembly Language (MAL) and all SQL datatypes are converted to MonetDB internal ATOM datatypes. In this example, we added nine SQL types to MonetDB that correspond to the nine different Encrypted Dictionaries presented above. The underlying datatype is string. They can be used in SQL create table statements like any other datatype, e.g., CREATE TABLE t1 (c1 ED1.1, c2 ED3.2, . . . ). Thus, the Data Owner can flexibly choose the tradeoffs between order leakage and frequency leakage considered appropriate for each column. We additionally introduced nine new ATOM datatypes into MonetDB's database kernel to handle incoming SQL queries after they get transformed to MAL.

We further split each Dictionary into a Dictionary Head and Dictionary Tail for the Encrypted Dictionaries. The Dictionary Tail contains variable length values that are encrypted with AES-128 in GCM mode. The values are stored sequentially in a random order. The Dictionary Head contains fixed size offset to the Dictionary Tail and the values are ordered according to the concrete Encrypted Datatype.

This split is done to support variable length data while allowing a performant binary search. For Dictionary search, we pass a pointer to the encrypted Dictionary Head and Dictionary Tail into the enclave and it directly loads the data from the untrusted host process. As a result, only one context switch is necessary.

While the previous example has focused upon implementation in conjunction with a column-oriented database, this is not required. Alternative embodiments could instead be implemented in conjunction with a row-oriented database structure.

Figure 15:
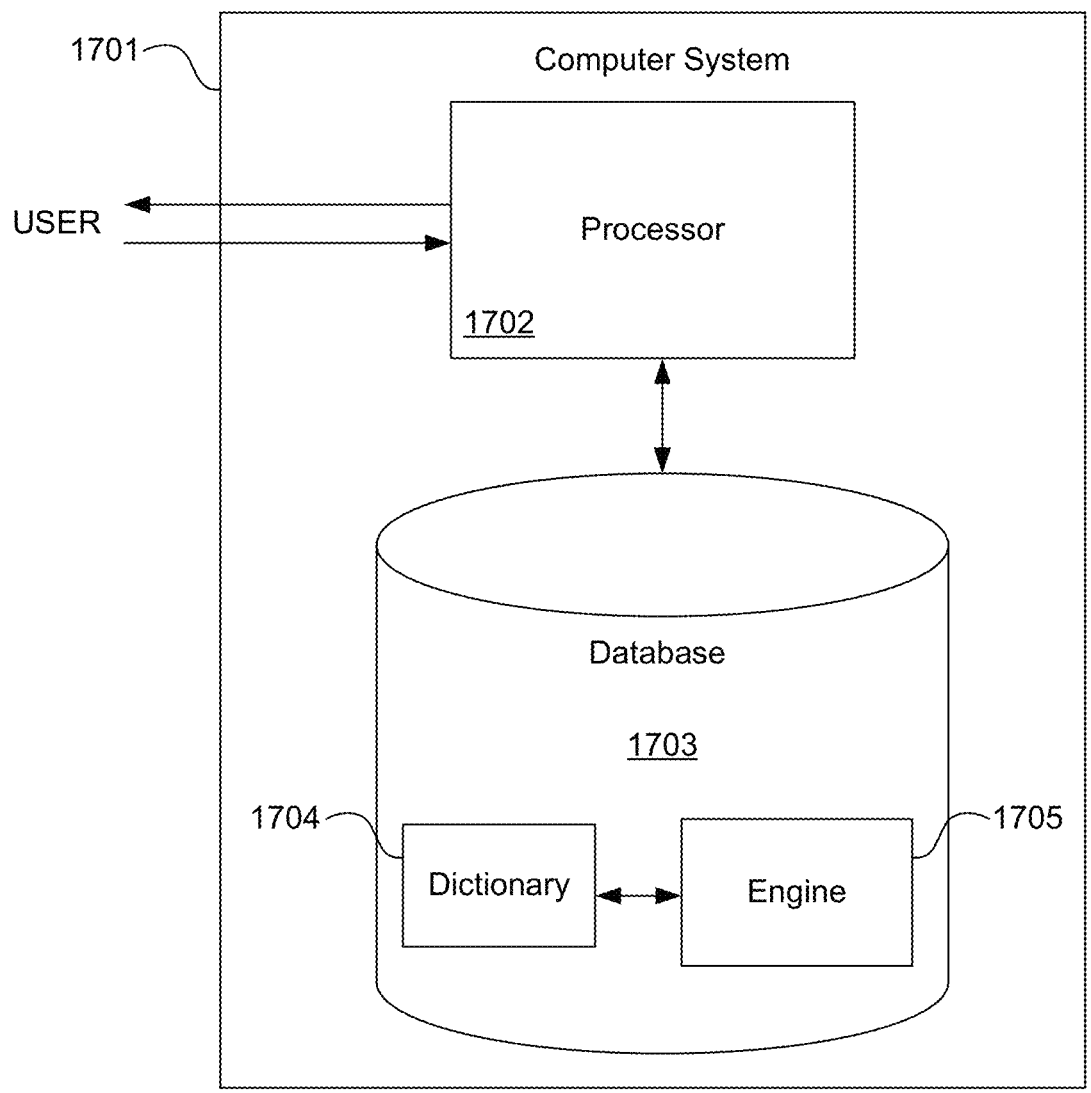
FIG. 15 illustrates hardware of a special purpose computing machine according to an embodiment that is configured to implement a dictionary encoded in-memory database according to certain embodiments.

FIG. 15 illustrates hardware of a special purpose computing machine configured to implement a dictionary encrypted in-memory database according to an embodiment. In particular, computer system 1701 comprises a processor 1702 that is in electronic communication with a non-transitory computer-readable storage medium comprising a database 1703. This computer-readable storage medium has stored thereon code 1705 corresponding to an engine. Code 1704 corresponds to attribute dictionary data. Code may be configured to reference data stored in a database of a non-transitory computer-readable storage medium, for example as may be present locally or in a remote database server. Software servers together may form a cluster or logical network of computer systems programmed with software programs that communicate with each other and work together in order to process requests.

An example computer system 1800 is illustrated in FIG. 16. Computer system 1810 includes a bus 1805 or other communication mechanism for communicating information, and a processor 1801 coupled with bus 1805 for processing information. Computer system 1810 also includes a memory 1802 coupled to bus 1805 for storing information and instructions to be executed by processor 1801, including information and instructions for performing the techniques described above, for example. This memory may also be used for storing variables or other intermediate information during execution of instructions to be executed by processor 1801. Possible implementations of this memory may be, but are not limited to, random access memory (RAM), read only memory (ROM), or both. A storage device 1803 is also provided for storing information and instructions. Common forms of storage devices include, for example, a hard drive, a magnetic disk, an optical disk, a CD-ROM, a DVD, a flash memory, a USB memory card, or any other medium from which a computer can read. Storage device 1803 may include source code, binary code, or software files for performing the techniques above, for example Storage device and memory are both examples of computer readable mediums.

Computer system 1810 may be coupled via bus 1805 to a display 1812, such as a cathode ray tube (CRT) or liquid crystal display (LCD), for displaying information to a computer user. An input device 1811 such as a keyboard and/or mouse is coupled to bus 1805 for communicating information and command selections from the user to processor 1801. The combination of these components allows the user to communicate with the system. In some systems, bus 1805 may be divided into multiple specialized buses.

Computer system 1810 also includes a network interface 1804 coupled with bus 1805. Network interface 1804 may provide two-way data communication between computer system 1810 and the local network 1820. The network interface 1804 may be a digital subscriber line (DSL) or a modem to provide data communication connection over a telephone line, for example. Another example of the network interface is a local area network (LAN) card to provide a data communication connection to a compatible LAN. Wireless links are another example. In any such implementation, network interface 1804 sends and receives electrical, electromagnetic, or optical signals that carry digital data streams representing various types of information.

Computer system 1810 can send and receive information, including messages or other interface actions, through the network interface 1804 across a local network 1820, an Intranet, or the Internet 1830. For a local network, computer system 1810 may communicate with a plurality of other computer machines, such as server 1815. Accordingly, computer system 1810 and server computer systems represented by server 1815 may form a cloud computing network, which may be programmed with processes described herein. In the Internet example, software components or services may reside on multiple different computer systems 1810 or servers 1831-1835 across the network. The processes described above may be implemented on one or more servers, for example. A server 1831 may transmit actions or messages from one component, through Internet 1830, local network 1820, and network interface 804 to a component on computer system 1810. The software components and processes described above may be implemented on any computer system and send and/or receive information across a network, for example.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:

1. A computer-implemented method comprising:
   a secure environment receiving a secret key;
   the secure environment receiving from a query engine located outside of the secure environment, an encrypted query range corresponding to a query issued by a user;
   the secure environment receiving from the query engine, a reference to a dictionary;
   the secure environment decrypting the encrypted query range using the secret key;
   the secure environment decrypting values of the dictionary according to the secret key;
   the secure environment searching the dictionary to produce list of value identifiers matching the encrypted query range;
   the secure environment returning the list of value identifiers to the query engine; and
   in response to receiving the list of value identifiers,
   the query engine is configured to reference vector attribute information stored in the database according to the list of value identifiers and generate a list of record identifiers for a query result, and
   the query engine is configured to return the query result to the user.

2. A method as in claim 1 further comprising the secure environment loading the dictionary from a database.

3. A method as in claim 2 wherein the database comprises a column-oriented database.

4. A method as in claim 1 wherein the dictionary dictates a characteristic selected from at least one of security strength, performance speed, and memory consumption.

5. A method as in claim 1 wherein the secure environment comprises a Trusted Execution Environment (TEE).

6. A method as in claim 5 wherein an attestation feature of the TEE is referenced for authentication prior to receiving the secret key.

7. A method as in claim 1 wherein the database comprises an in-memory database.

8. A method as in claim 7 wherein the query engine comprises an in-memory database engine of the in-memory database.

9. A method as in claim 7 wherein the in-memory database comprises a hybrid database.

10. A method as in claim 1 wherein the database comprises a row-oriented database.

11. A non-transitory computer readable storage medium embodying a computer program for performing a method, said method comprising:
    a secure environment receiving a secret key;
    the secure environment receiving from a query engine located outside of the secure environment, an encrypted query range corresponding to a query issued by a user;
    the secure environment receiving from the query engine, a reference to a dictionary;
    the secure environment loading the dictionary from a column-oriented database;
    the secure environment decrypting the encrypted query range using the secret key;
    the secure environment decrypting values of the dictionary according to the secret key;
    the secure environment searching the dictionary to produce list of value identifiers matching the encrypted query range;
    the secure environment returning the list of value identifiers to the query engine; and
    in response to receiving the list of value identifiers,
    the query engine is configured to reference vector attribute information stored in the database according to the list of value identifiers and generate a list of record identifiers for a query result, and
    the query engine is configured to return the query result to the user.

12. A non-transitory computer readable storage medium as in claim 11 wherein the dictionary determines a characteristic selected from at least one of security strength, performance speed, and memory consumption.

13. A non-transitory computer readable storage medium as in claim 11 wherein:
the secure environment comprises a Trusted Execution Environment (TEE); and
an attestation feature of the TEE is referenced for authentication prior to receiving the secret key.

14. A non-transitory computer readable storage medium as in claim 11 wherein:
the column-oriented database comprises a column-oriented in-memory database; and
the query engine comprises an in-memory database engine of the column-oriented in-memory database.

15. A computer system comprising:
one or more processors;
a software program, executable on said computer system, the software program configured to cause a secure environment to:
receive a secret key;
receive from an in-memory database engine of an in-memory database located outside of the secure environment, an encrypted query range corresponding to a query issued by a user;
receive from the in-memory database engine, a reference to a dictionary;
decrypt the encrypted query range using the secret key;
decrypt values of the dictionary according to the secret key;
search the dictionary to produce list of value identifiers matching the encrypted query range;
return the list of value identifiers to the in-memory database engine; and
in response to receiving the list of value identifiers, the in-memory database engine is configured to reference vector attribute information stored in the database according to the list of value identifiers and generate a list of record identifiers for a query result, and
the in-memory database engine is configured to return the query result to the user.

16. A computer system as in claim 15 wherein the software program is further configured to cause the secure environment to load the dictionary from the in-memory database.

17. A computer system as in claim 15 wherein the in-memory database is a column-oriented in-memory database.

18. A computer system as in claim 15 wherein the dictionary determines a characteristic selected from at least one of security strength, performance speed, and memory consumption.

19. A computer system as in claim 15 wherein:
the secure environment comprises a Trusted Execution Environment (TEE); and
an attestation feature of the TEE is referenced for authentication prior to receiving the secret key.

20. A computer system as in claim 15 wherein the in-memory database comprises a row-oriented in-memory database.

* * * * *